(12) United States Patent
Delfino

(10) Patent No.: US 10,994,573 B2
(45) Date of Patent: *May 4, 2021

(54) MULTI-COMPOSITE PLANAR REINFORCEMENT

(71) Applicant: COMPAGNIE GENERALE DES ETABLISSEMENTS MICHELIN, Clermont-Ferrand (FR)

(72) Inventor: Antonio Delfino, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 462 days.

This patent is subject to a terminal disclaimer.

(21) Appl. No.: 15/577,414

(22) PCT Filed: May 27, 2016

(86) PCT No.: PCT/EP2016/061990
§ 371 (c)(1),
(2) Date: Nov. 28, 2017

(87) PCT Pub. No.: WO2016/189126
PCT Pub. Date: Dec. 1, 2016

(65) Prior Publication Data
US 2018/0170109 A1 Jun. 21, 2018

(30) Foreign Application Priority Data

May 28, 2015 (FR) ..................................... 1554800

(51) Int. Cl.
*B60C 1/00* (2006.01)
*B60C 9/00* (2006.01)
(Continued)

(52) U.S. Cl.
CPC ............ *B60C 9/0064* (2013.01); *B29C 70/20* (2013.01); *B60C 9/0028* (2013.01); *B60C 9/12* (2013.01);
(Continued)

(58) Field of Classification Search
CPC .......... B60C 1/0041; B60C 2001/0066; B60C 9/0064; B60C 2009/0078;
(Continued)

(56) References Cited

U.S. PATENT DOCUMENTS 4,882,370 A 11/1989 Jordan et al.
5,246,051 A 9/1993 Inada et al.
(Continued)

FOREIGN PATENT DOCUMENTS

DE 102006023231 A1 11/2007
EP 0822056 A2 2/1998
(Continued)

OTHER PUBLICATIONS

International Search Report dated Aug. 17, 2016, issued by EPO in connection with International Application No. PCT/EP2016/061990.
(Continued)

*Primary Examiner* — Joanna Pleszczynska
(74) *Attorney, Agent, or Firm* — Venable LLP

(57) ABSTRACT

A flat reinforcer has the shape of a multicomposite strip defining three main perpendicular directions, the axial direction (X), the transverse direction (Y) and the radial direction (Z), having a width $W_R$ measured along the Y direction of between 2 and 100 mm and having a thickness $T_R$ measured along the Z direction of between 0.1 and 5 mm, the aspect ratio $W_R/T_R$ being greater than 3. The multicomposite strip comprises at least a plurality of monofilaments made of composite material, orientated along the X direction, com-
(Continued)

prising filaments of a mineral material (101) embedded in a thermoset resin (102), the glass transition temperature of which, denoted $Tg_1$, is greater than 70° C. The plurality of monofilaments are coated in a layer of thermoplastic material (12); and all or some of these monofilaments are flat, of cross section having a width $W_M$ measured along the Y direction and having a thickness $T_M$ measured along the Z direction, with an aspect ratio $W_M/T_M$ greater than 1.5.

68 Claims, 6 Drawing Sheets

(51) Int. Cl.
| | | |
|---|---|---|
| B60C 9/12 | (2006.01) | |
| B60C 9/18 | (2006.01) | |
| B32B 5/00 | (2006.01) | |
| B32B 5/02 | (2006.01) | |
| B32B 27/12 | (2006.01) | |
| D02G 3/48 | (2006.01) | |
| C03C 25/50 | (2006.01) | |
| B29C 70/20 | (2006.01) | |
| B60C 9/20 | (2006.01) | |
| B60C 9/02 | (2006.01) | |

(52) U.S. Cl.
CPC ............ B60C 9/1821 (2013.01); C03C 25/50 (2013.01); D02G 3/48 (2013.01); B60C 2009/0078 (2013.01); B60C 2009/0085 (2013.01); B60C 2009/0276 (2013.01); B60C 2009/0284 (2013.01); B60C 2009/208 (2013.01); B60C 2009/2064 (2013.01); B60C 2009/2067 (2013.01); B60C 2009/2077 (2013.01); D10B 2101/06 (2013.01); D10B 2101/08 (2013.01); D10B 2101/10 (2013.01)

(58) Field of Classification Search
CPC . B60C 2009/0085; B60C 9/0028; B60C 9/12; B60C 9/1821; B32B 5/00; B32B 5/02; B32B 27/04; B32B 27/12; B32B 2255/02; B32B 2260/021
See application file for complete search history.

(56) References Cited

U.S. PATENT DOCUMENTS

| | | | |
|---|---|---|---|
| 5,556,496 A | 9/1996 | Sumerak | |
| 5,700,417 A | 12/1997 | Fernyhough et al. | |
| 5,935,508 A | 8/1999 | Fernyhough et al. | |
| 6,190,483 B1 | 2/2001 | Yang et al. | |
| 6,640,859 B1 | 11/2003 | Laurent et al. | |
| 6,769,465 B2 | 8/2004 | Rhyne et al. | |
| 6,875,297 B1 | 4/2005 | Meuwly et al. | |
| 6,926,853 B2 | 8/2005 | Hinc et al. | |
| 6,994,135 B2 | 2/2006 | Delfino et al. | |
| 7,032,634 B2 | 4/2006 | Laurent et al. | |
| 7,032,637 B2 | 4/2006 | Meraldi | |
| 7,201,194 B2 | 4/2007 | Rhyne et al. | |
| 7,484,949 B2 | 2/2009 | Hinc et al. | |
| 7,754,819 B2 | 7/2010 | Chino et al. | |
| 8,277,590 B2 | 10/2012 | Delfino et al. | |
| 8,517,068 B2 | 8/2013 | Delfino et al. | |
| 8,585,947 B2 | 11/2013 | Meraldi et al. | |
| 8,763,662 B2 | 7/2014 | Abad et al. | |
| 8,785,543 B2 | 7/2014 | Abad et al. | |
| 8,790,788 B2 | 7/2014 | Custodero et al. | |
| 8,962,120 B2 | 2/2015 | Delfino et al. | |
| 8,968,871 B2 | 3/2015 | Abad et al. | |
| 8,973,634 B2 | 3/2015 | Custodero et al. | |
| 9,540,766 B2 | 1/2017 | Abad et al. | |
| 9,821,606 B2 | 11/2017 | Abad et al. | |
| 9,840,644 B2 | 12/2017 | Doisneau et al. | |
| 2002/0043319 A1 | 4/2002 | Meraldi | |
| 2002/0124929 A1 | 9/2002 | Rhyne et al. | |
| 2003/0015827 A1 | 1/2003 | Hinc et al. | |
| 2003/0213541 A1 | 11/2003 | Laurent et al. | |
| 2003/0226630 A1 | 12/2003 | Deltino et al. | |
| 2005/0173823 A1 | 8/2005 | Hinc et al. | |
| 2009/0022921 A1 | 1/2009 | Meraldi et al. | |
| 2010/0181006 A1 | 7/2010 | Delfino et al. | |
| 2010/0282392 A1* | 11/2010 | Deal | B60C 9/023 152/551 |
| 2010/0307653 A1 | 12/2010 | Delfino et al. | |
| 2011/0260525 A1 | 10/2011 | Delfino et al. | |
| 2012/0125506 A1 | 5/2012 | Custodero et al. | |
| 2012/0128972 A1 | 5/2012 | Custodero et al. | |
| 2012/0180921 A1 | 7/2012 | Abad et al. | |
| 2012/0193004 A1* | 8/2012 | Anderson | B60C 7/105 152/310 |
| 2012/0267023 A1 | 10/2012 | Abad et al. | |
| 2013/0177764 A1 | 7/2013 | Abad et al. | |
| 2013/0233458 A1 | 9/2013 | Meraldi et al. | |
| 2013/0273366 A1* | 10/2013 | Abad | B29B 15/08 428/378 |
| 2013/0280511 A1 | 10/2013 | Abad et al. | |
| 2013/0327459 A1 | 12/2013 | Rhyne et al. | |
| 2014/0044964 A1 | 2/2014 | Abad et al. | |
| 2014/0045983 A1 | 2/2014 | Abad et al. | |
| 2014/0045984 A1 | 2/2014 | Abad et al. | |
| 2014/0051312 A1 | 2/2014 | Abad et al. | |
| 2014/0235124 A1 | 8/2014 | Doisneau et al. | |
| 2014/0235125 A1 | 8/2014 | Doisneau et al. | |
| 2014/0308864 A1 | 10/2014 | Doisneau et al. | |
| 2015/0004413 A1 | 1/2015 | Abad et al. | |
| 2015/0030851 A1 | 1/2015 | Abad et al. | |
| 2015/0053327 A1 | 2/2015 | Harada et al. | |
| 2015/0122394 A1 | 5/2015 | Huyghe et al. | |
| 2015/0144245 A1 | 5/2015 | Bucher et al. | |
| 2015/0174968 A1 | 6/2015 | Huyghe et al. | |
| 2016/0159152 A1 | 6/2016 | Delfino et al. | B60C 9/005 |
| 2016/0185051 A1 | 6/2016 | Delfino et al. | |
| 2016/0318342 A1 | 11/2016 | Delfino | |
| 2017/0050468 A1 | 2/2017 | Delfino | B60C 9/0028 |

FOREIGN PATENT DOCUMENTS

| | | |
|---|---|---|
| EP | 1074369 A1 | 2/2001 |
| EP | 1162228 A1 | 12/2001 |
| EP | 1167080 A1 | 1/2002 |
| EP | 1174250 A1 | 1/2002 |
| EP | 1242254 | 9/2002 |
| EP | 1359028 A1 | 11/2003 |
| EP | 2 765 333 A1 | 8/2014 |
| EP | 2 781 371 A1 | 9/2014 |
| FR | 2765346 A1 | 12/1998 |
| FR | 2986456 A1 | 8/2013 |
| GB | 2297332 A | 7/1996 |
| JP | 4-202825 A | 7/1992 |
| WO | 00/37269 A1 | 6/2000 |
| WO | 01/42033 A1 | 6/2001 |
| WO | 2007/085414 A1 | 8/2007 |
| WO | 2008/080535 A1 | 7/2008 |
| WO | 2009/033620 A1 | 3/2009 |
| WO | 2009/135561 A2 | 11/2009 |
| WO | 2010/105975 A1 | 9/2010 |
| WO | 2010/136389 A1 | 12/2010 |
| WO | 2011/012521 A1 | 2/2011 |
| WO | 2011/051204 A1 | 5/2011 |
| WO | 2012/016757 A1 | 2/2012 |
| WO | 2012/032000 A1 | 3/2012 |
| WO | 2012/038340 A1 | 3/2012 |
| WO | 2012/038341 A1 | 3/2012 |
| WO | 2012069346 A1 | 5/2012 |
| WO | 2012/104279 A1 | 8/2012 |
| WO | 2012/104280 A1 | 8/2012 |
| WO | 2012/104281 A1 | 8/2012 |
| WO | 2012/115615 A1 | 8/2012 |
| WO | 2013/017421 A1 | 2/2013 |
| WO | 2013/017422 A1 | 2/2013 |
| WO | 2013/017423 A1 | 2/2013 |

(56) References Cited

FOREIGN PATENT DOCUMENTS

| WO | 2013/117474 A1 | 8/2013 |
| WO | 2013/117475 A1 | 8/2013 |
| WO | 2015/014578 A1 | 2/2015 |
| WO | 2015/165777 A1 | 11/2015 |

OTHER PUBLICATIONS

D. Sinclair, "A Bending Method for Measurement of the Tensile Strength and Young's Modulus of Glass Fibers", J. Appl. Phys., vol. 21, pp. 380-386 (1950).

R.H. Thompson, et al., "Critical compressive stress for continuous fiber unidirectional composites", J. Comp. Mater., vol. 46, No. 26, pp. 3231-3245 (2012).

T.B. Rhyne, et al., "Development of a Non-Pneumatic Wheel", Tire Science and Technology, TSTCA, vol. 34, No. 3, pp. 150-169 (2006).

\* cited by examiner

US 10,994,573 B2

MULTI-COMPOSITE PLANAR REINFORCEMENT

1. FIELD OF THE INVENTION

The field of the present invention is that of composite reinforcers and of multilayer laminates that can be used especially for reinforcing rubber or plastic articles or semi-finished products such as vehicle tyres of the pneumatic or non-pneumatic type.

It relates more particularly to composite reinforcers in the form of strips based on composite monofilaments made of filaments of mineral material embedded in a thermoset resin having high mechanical and thermal properties, and the use of such monofilaments as reinforcing elements of these semi-finished products, articles and in particular tyres.

2. PRIOR ART

Tyre designers have long sought low density textile or composite type "reinforcers" (elongate reinforcing elements) which could advantageously and effectively replace the conventional metal wires or cords, with a view to reducing especially the weight of these tyres and also to remedying any problems of corrosion.

Thus, patent application EP 1 167 080 (or U.S. Pat. No. 7,032,637) has already described a GRC (abbreviation for glass-resin composite) monofilament with high mechanical properties, comprising continuous unidirectional glass fibres, impregnated in a crosslinked resin of vinyl ester type. As well as a high compressive breaking stress which is greater than its tensile breaking stress, this monofilament has an elongation at break of the order of 3.0 to 3.5% and an initial tensile modulus of at least 30 GPa; its thermoset resin has a Tg (glass transition temperature) of greater than 130° C. and an initial tensile modulus of at least 3 GPa.

By virtue of the above properties, this application EP 1 167 080 showed that it was advantageously possible to replace steel cords with composite monofilaments, positioned in particular under the tread in parallel sections, as novel reinforcing elements for pneumatic tyre belts, thereby making it possible to significantly lighten the structure of these tyres.

However, it was noted, unexpectedly, that these composite monofilaments of the prior art, when they were used as belt reinforcers for certain pneumatic tyres, could undergo a certain number of breakages in compression by a collapse or buckling of their structure during the very manufacturing of these tyres, more specifically during the shaping step and/or the final step of curing these tyres in a mould which, as is known, is carried out at high pressure and a very high temperature, typically of greater than 160° C.

It is in this way that the applicant companies, in patent application WO 2015/014578 published recently, have already proposed a novel GRC monofilament with improved Tg, elongation at break and modulus properties, giving the latter properties in compression, in particular under high temperature, that are significantly improved relative to those of the GRC monofilaments from the prior art described in the aforementioned application EP 1 167 080, and that make it possible to overcome the aforementioned problem.

Experience has shown, nonetheless, that the composite monofilaments described in the above-described patent documents can be further improved, most particularly for their use in pneumatic or non-pneumatic tyres for vehicles.

3. BRIEF DESCRIPTION OF THE INVENTION

Continuing their research studies, the applicant companies have discovered a novel reinforcer, based on composite monofilaments, of which the properties in compression, bending or under transverse shear are significantly improved relative to those of the composite monofilaments of the prior art.

Thus, according to a first subject, the present invention relates (especially in reference to the appended FIGS. 1 to 6) to a flat reinforcer having the shape of a multicomposite strip (R1, R2, R3) defining three main perpendicular directions, the axial direction (X), the transverse direction (Y) and the radial direction (Z), having a width denoted $W_R$ measured along the Y direction of between 2 and 100 mm and having a thickness denoted $T_R$ measured along the Z direction of between 0.1 and 5 mm, the ratio $W_R/T_R$ being greater than 3, this multicomposite strip comprising at least:

- a plurality of monofilaments (10, 20) made of composite material, orientated along the X direction, comprising filaments of a mineral material (101) embedded in a thermoset resin (102), the glass transition temperature of which, denoted $Tg_1$, is greater than 70° C.;
- this plurality of monofilaments being coated in a layer of thermoplastic material (12);
- all or some of these monofilaments (10, 20) themselves being flat, having a width denoted $W_M$ measured along the Y direction and having a thickness denoted $T_M$ measured along the Z direction, with an aspect ratio $W_M/T_M$ greater than 1.5

It has been observed that the specific flat shape of the strip, combined on the one hand with the presence of this layer of thermoplastic material and on the other hand with the use of monofilaments which are themselves of flattened shape, was capable of imparting properties of endurance in compression, bending or under transverse shear (perpendicular to the X axis of the monofilaments and of the strip) which are significantly improved, in particular at a high temperature, compared with those of composite monofilaments that are used conventionally, notably without this layer of thermoplastic material coating them.

Moreover, the thermoplastic, and therefore thermofusible, nature of the material covering the monofilaments very advantageously makes it possible to manufacture, in a way by "thermal bonding or assembly", a wide variety of more complex multicomposite structures, based on strips in accordance with the invention, this by at least partial melting of this covering material, then cooling of the assembly once the individual strips have been placed together, arranged in an appropriate manner.

The invention also relates to any multilayer laminate comprising at least one multicomposite strip according to the invention, positioned between and in contact with two layers of rubber, especially diene rubber, composition.

The invention also relates to any plastic or rubber finished article or semi-finished product comprising a multicomposite reinforcer or a multilayer laminate in accordance with the invention. The invention relates more particularly to a pneumatic or non-pneumatic tyre, the multicomposite reinforcer or the multilayer laminate being present in the belt of the tyre or in the carcass reinforcement of the tyre, or in the bead zone of the tyre.

The invention also relates to the use of a multicomposite reinforcer or multilayer laminate according to the invention, as reinforcing element for rubber or plastic articles or semi-finished products such as pipes, belts, conveyor belts, pneumatic or non-pneumatic tyres for vehicles, as well as these articles, semi-finished products and tyres themselves, both in the uncured state (that is to say before curing or vulcanization) and in the cured state (after curing).

The tyres of the invention, in particular, may be intended for motor vehicles of the passenger, 4×4 and SUV (Sport Utility Vehicle) type, but also for industrial vehicles chosen from vans, "heavy" vehicles—i.e., underground trains, buses, heavy road transport vehicles (lorries, towing vehicles, trailers), off-road vehicles-, agricultural or civil engineering machines, aircraft and other transport or handling utility vehicles.

The multicomposite reinforcer and multilayer laminate of the invention can most particularly be used as reinforcing elements in crown reinforcements (or belts) or in carcass reinforcements of pneumatic or non-pneumatic tyres, as described especially for pneumatic tyres in the aforementioned documents EP 1 167 080 or U.S. Pat. No. 7,032,637. They could also be present in the bead zone of such tyres.

The multicomposite strip of the invention can also advantageously be used, due to its low density and its properties in compression, bending and under transverse shear which are improved, as a reinforcing element in tyres or flexible wheels of non-pneumatic type, that is to say which are structurally supported (without internal pressure). Such tyres are well known to those skilled in the art (see for example EP 1 242 254 or U.S. Pat. No. 6,769,465, EP 1 359 028 or U.S. Pat. No. 6,994,135, EP 1 242 254 or U.S. Pat. Nos. 6,769,465, 7,201,194, WO 00/37269 or U.S. Pat. No. 6,640, 859, WO 2007/085414, WO 2008/080535, WO 2009/033620, WO 2009/135561, WO 2012/032000); when they are combined with any rigid mechanical element intended to create the link between the flexible tyre and the hub of a wheel, they replace the assembly made up of the pneumatic tyre, the wheel rim and the disc as they are known in the majority of contemporary road vehicles.

BRIEF DESCRIPTION OF THE FIGURES

The invention and the advantages thereof will be readily understood in light of the following detailed description and exemplary embodiments, and also FIGS. 1 to 8 which relate to these examples and which show, in a schematic manner (without being true to scale):

in cross section, a flat monofilament (10), of rectangular cross section, that can be used in a multicomposite reinforcer in accordance with the invention (FIG. 1);

Figure 2:
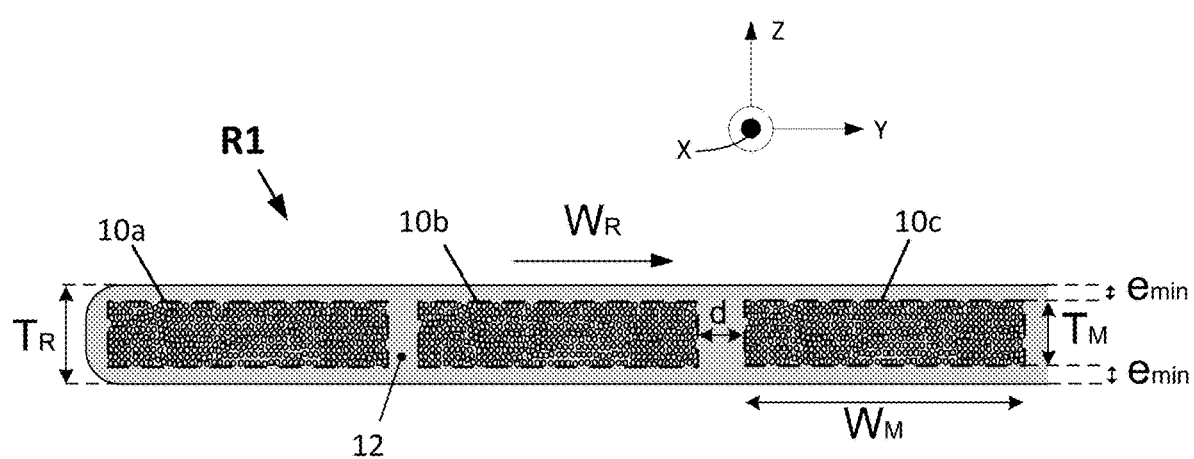
Figure 3:
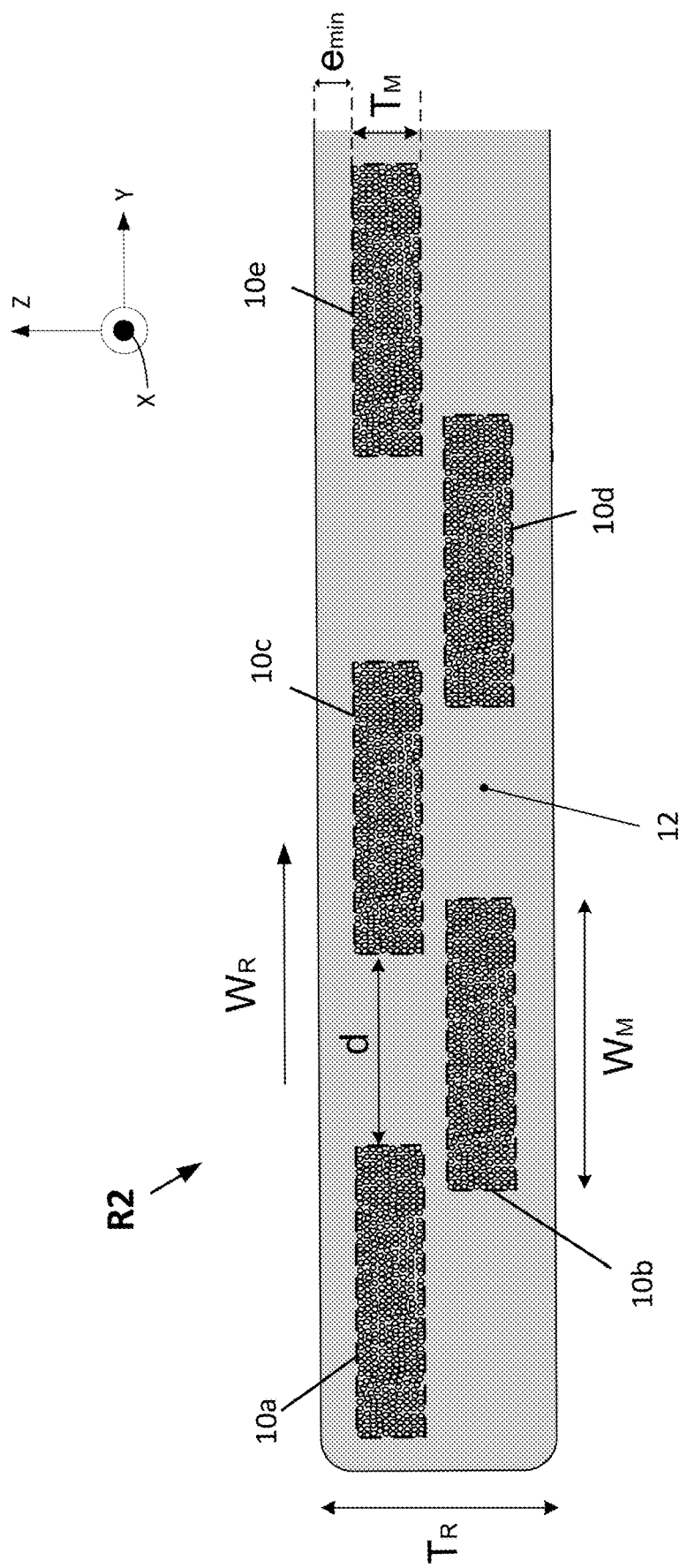
Figure 4:
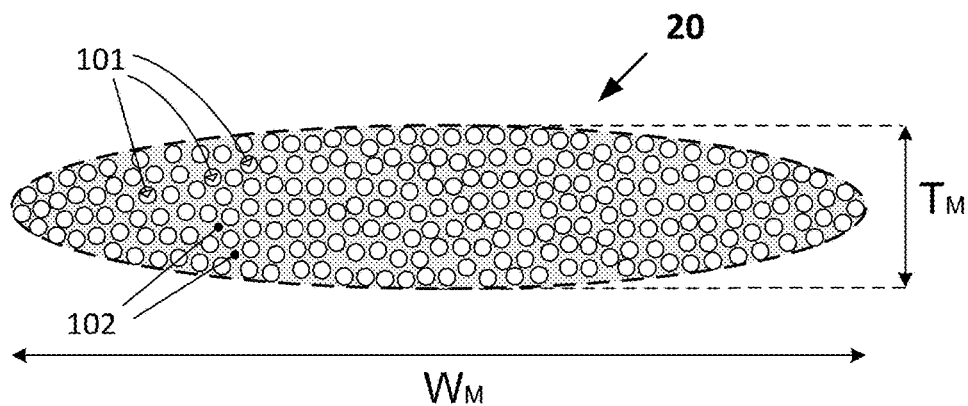
Figure 5:
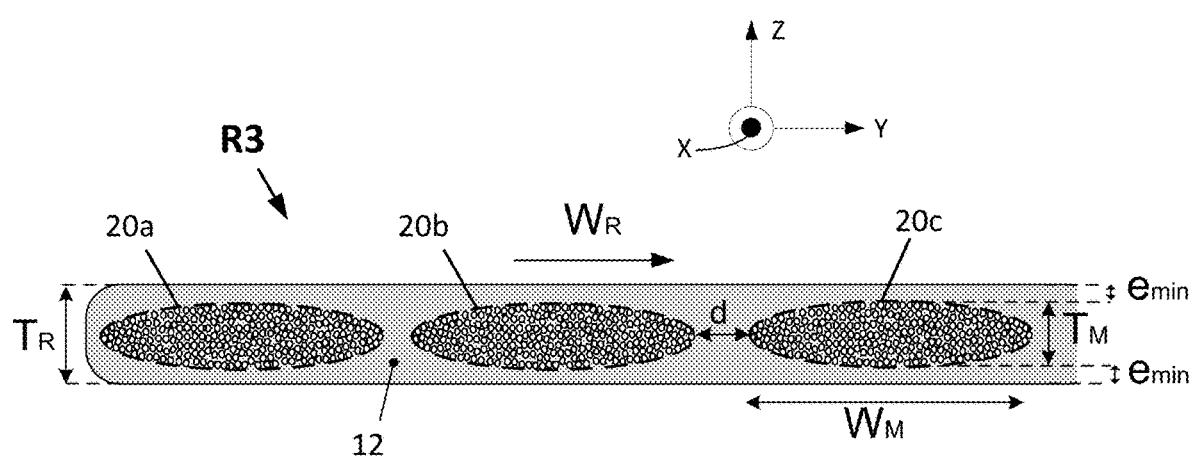
Figure 6:
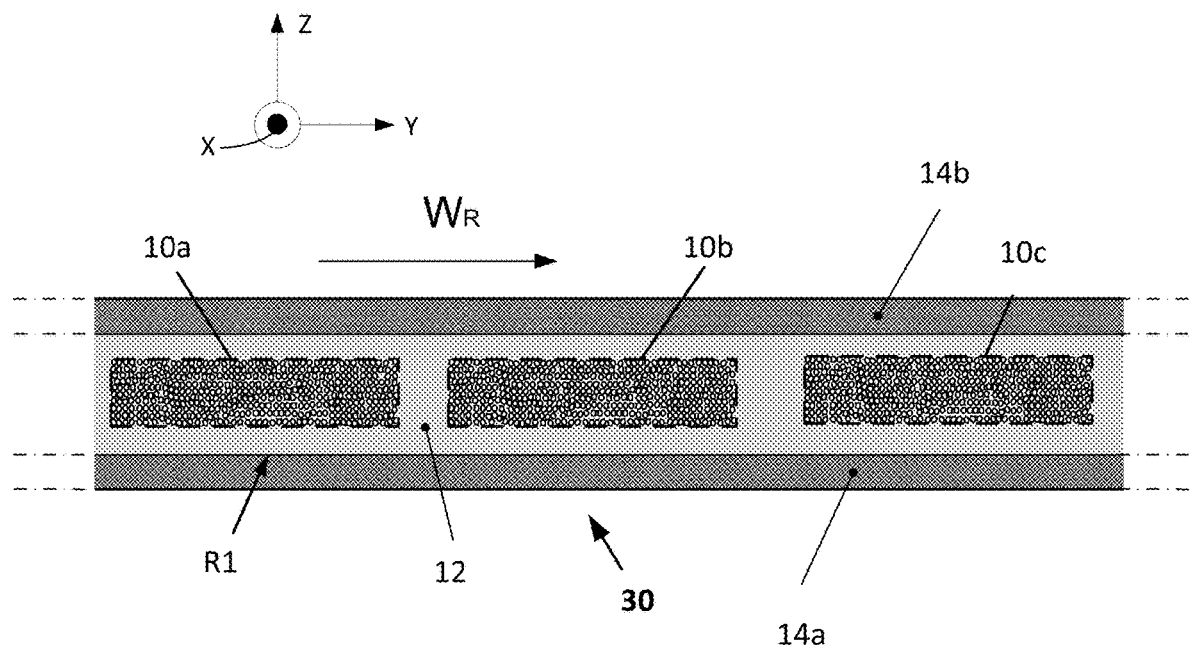
Figure 7:
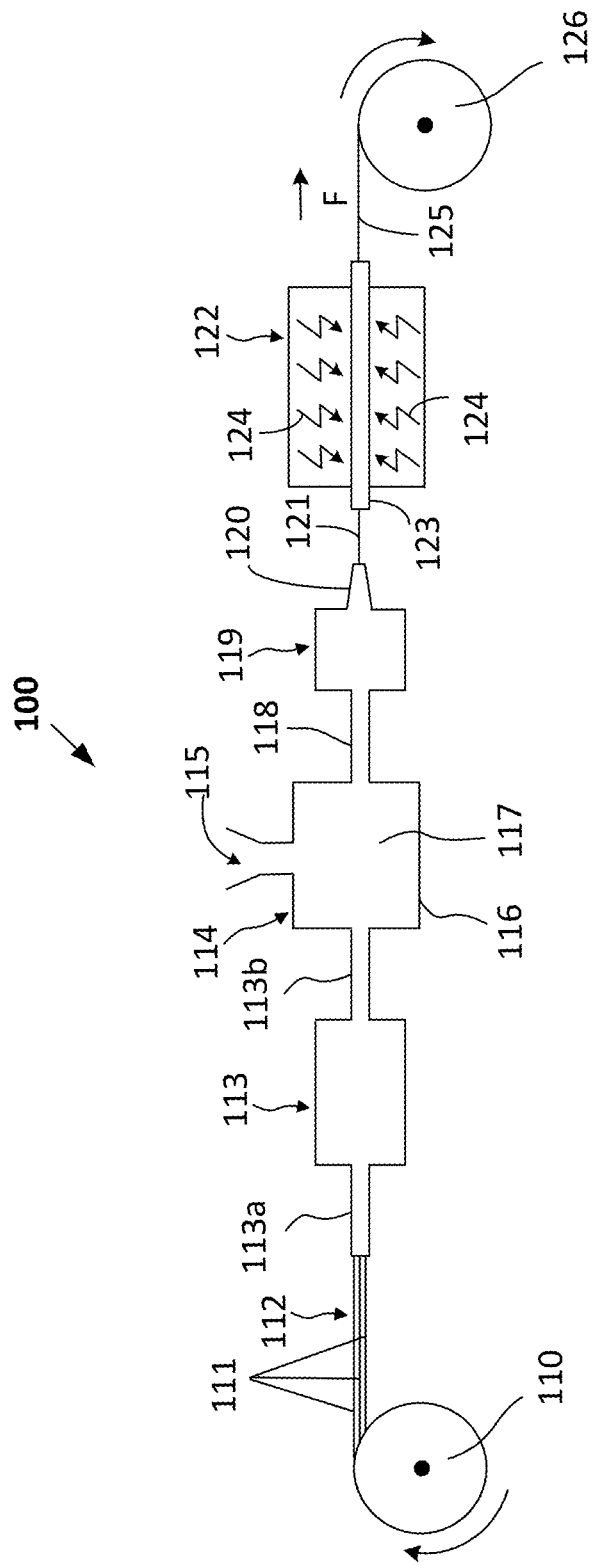
Figure 8:
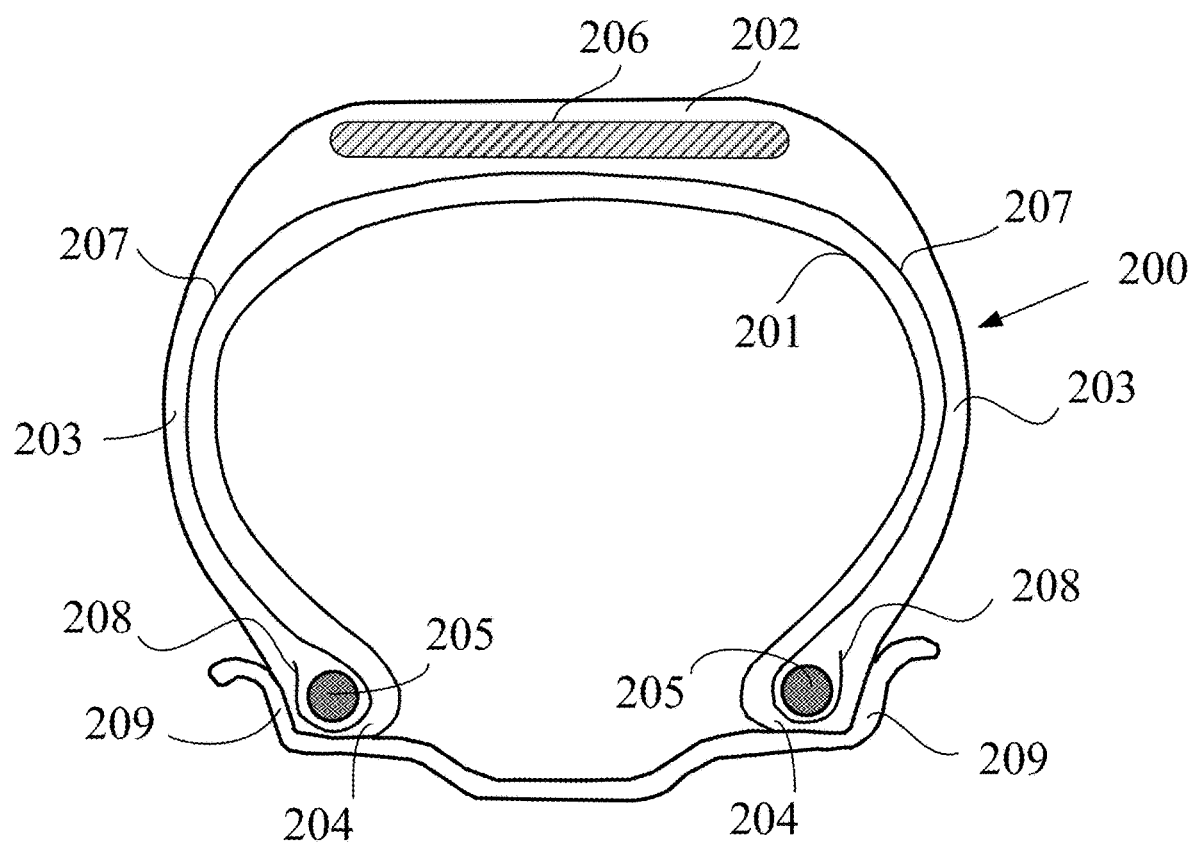

in cross section, an example (R1) of a multicomposite strip in accordance with the invention based on a plurality of flat monofilaments (10) (FIG. 2);

in cross section, another example (R2) of a multicomposite strip in accordance with the invention based on a plurality of flat monofilaments (FIG. 3);

in cross section, another example of a monofilament (20) of flat form, this time of oblong cross section, that can be used in a multicomposite strip according to the invention (FIG. 4);

in cross section, another example (R3) of a multicomposite strip in accordance with the invention based on monofilaments (20) of oblong cross section (FIG. 5);

in cross section, an example (30) of a multilayer laminate according to the invention comprising a multicomposite strip according to the invention (for example R1) itself positioned between two layers of rubber compositions (FIG. 6);

a device that can be used for the manufacture of a monofilament (10 or 20) that can be used as a base constituent element of a multicomposite strip according to the invention (FIG. 7);

in radial section, an example of a pneumatic tyre according to the invention, incorporating a multicomposite strip and a multilayer laminate according to the invention (FIG. 8).

4. DETAILED DESCRIPTION OF THE INVENTION

In the present application, unless expressly indicated otherwise, all the percentages (%) shown are percentages by weight.

Any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

Unless expressly indicated otherwise, all the tensile or compressive mechanical properties are measured (on monofilament, thermoset resin, or else thermoplastic material) at a temperature of 20° C.

The invention therefore relates to a reinforcer of multicomposite type, in other words a composite of composite, which has the feature of being flat, of being in the form of a strip, that is to say a straight elongate continuous element, of long length relative to the dimensions of its cross section.

A "flat" reinforcer is understood here, by convention and generally, to mean a reinforcer of which the aspect ratio or width to thickness ratio ($W_R/T_R$) of the cross section is greater than 3, irrespective of the particular shape (rectangular or non-rectangular, for example oval or oblong, concave or convex) of its cross section, it being understood that the preferential shape of the cross section of the strip is substantially rectangular or oblong.

This multicomposite flat strip or reinforcer, as depicted for example partially in FIG. 2 (R1), FIG. 3 (R2) or FIG. 5 (R3), which may define three main perpendicular directions, the axial direction (X), the transverse direction (Y) and the radial direction (Z), therefore has a width $W_R$ measured along Y of between 2 and 100 mm and a thickness $T_R$ measured along Z between 0.1 and 5 mm, the ratio $W_R/T_R$ being by definition greater than 3.

It has the essential features of comprising at least:
  a plurality (that is to say two or more than two) of monofilaments (10, 20) made of composite material, orientated along the X direction, comprising filaments of a mineral material (101) embedded in a thermoset resin (102), the glass transition temperature of which, denoted $Tg_1$, is greater than 70° C.;
  this plurality of monofilaments being coated by a layer of thermoplastic material (12);
  all or some of these monofilaments (10, 20), preferably all, being monofilaments that are themselves of flat form, that is to say having an anisometric cross section, with a width $W_M$ measured along the Y direction and a thickness $T_M$ measured along the Z direction such that their aspect ratio $W_M/T_M$ is greater than 1.5.

A "flat" monofilament is understood, by definition, to mean a monofilament of which the aspect ratio or width to thickness ratio ($W_M/T_M$) of the anisometric cross section is greater than 1.5, irrespective of the particular shape (rectangular or non-rectangular, for example oval or oblong, concave or convex) of its cross section. Preferably, the shape of the cross section of the flat monofilaments is substantially rectangular or oblong.

The structure of the multicomposite strip of the invention is described in detail below.

The appended FIGS. 2, 3 and 5 very schematically illustrate, in cross section, examples (denoted R1, R2 or R3) of multicomposite strips in accordance with the invention respectively based on monofilaments (10, 20) of anisometric cross section, for example rectangular (10) or oblong (20), cross section.

It is seen that the structure of the strips in accordance with the invention may be defined along the three main perpendicular directions, an axial direction (X) corresponding to the longitudinal axis or length of the strip, a transverse direction (Y) corresponding to the direction of the width $W_R$ of the strip and a direction referred to as the radial direction (Z) corresponding to the thickness $T_R$ of the strip.

Preferably, their width $W_R$ measured along Y is between 2.5 and 50 mm; the ratio $W_R/T_R$ is preferably greater than 5, more preferably greater than 10.

Preferably, in particular when the strip of the invention is intended to reinforce a rubber article such as a vehicle tyre, the width $W_R$ is between 3 and 40 mm, in particular between 5 and 25 mm, and the thickness $T_R$ is between 0.15 and 3 mm, more preferably between 0.20 and 2.5 mm, in particular between 0.5 and 1.5 mm; the ratio $W_R/T_R$ is more preferably between 10 and 50, in particular between 10 and 30.

Figure 1:
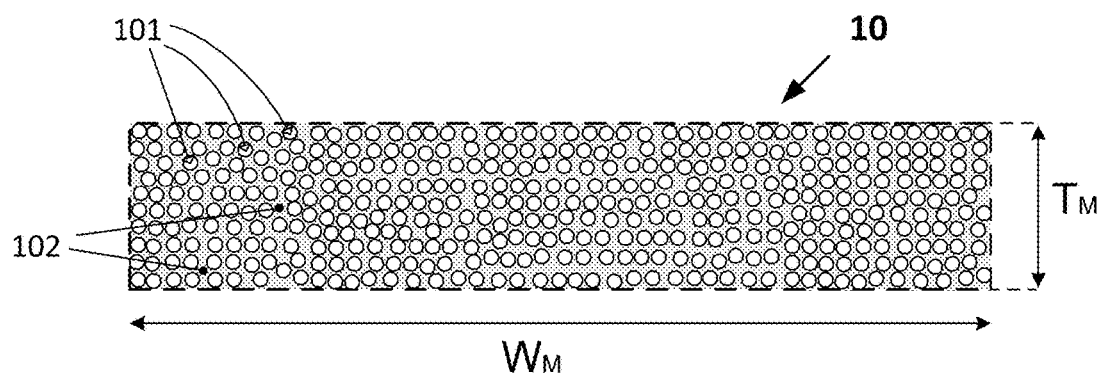

As illustrated for example in FIGS. 1 and 4, each monofilament (10 or 20) made of composite material, orientated along the X direction, comprises filaments of a mineral material (101) embedded in a thermoset resin (102) the glass transition temperature of which, denoted $Tg_1$, is greater than 70° C., preferably greater than 100° C., more preferably greater than 150° C., in particular greater than 170° C., more particularly greater than 190° C.

As illustrated for example in FIGS. 2, 3 and 5, all of the composite monofilaments (10a, 10b, 10c, etc.; 20a, 20b, 20c, etc.) are coated with a layer of thermoplastic material (12), embedded in the latter, a thermoplastic material of which the glass transition temperature, denoted $Tg_2$, is preferably greater than −30° C., more preferably greater than 20° C., more preferably still greater than 50° C., in particular greater than 70° C.

The thickness, denoted $T_M$, of each constituent flat monofilament of the multicomposite strip of the invention is preferably between 0.05 and 3.0 mm, more preferably between 0.1 and 2.5 mm, in particular between 0.15 and 2.0 mm. This feature covers, for example, both composite monofilaments of essentially rectangular shape as illustrated for example in FIG. 1, and composite monofilaments of different shapes, for example of oblong shape (that is to say more or less oval) as illustrated for example in FIG. 4.

The elongation at break, denoted Ar of the multicomposite strip of the invention, measured at 20° C., is preferably equal to or greater than 3.0%, more preferably equal to or greater than 3.5%.

Its longitudinal (i.e. in the X direction) tensile modulus (Young's modulus or initial modulus) denoted $E_{RL20}$, measured at 20° C., is preferably greater than 10 GPa, in particular between 10 and 20 GPa; it is more preferably greater than 12 GPa, in particular between 12 and 20 GPa.

Its transverse (i.e. in the Y direction) tensile modulus (Young's modulus or initial modulus) denoted $E_{RT20}$, measured at 20° C., is preferably greater than 300 MPa, more preferably between 300 and 3000 MPa, more preferably still greater than 1000 MPa, in particular between 1000 and 3000 MPa; it is more particularly greater than 1300 MPa, in particular between 1300 and 2500 MPa.

In this strip of the invention, the initial tensile modulus ($E_{M20}$, along X) of each monofilament, measured at 20° C., is preferably greater than 30 GPa, more preferably greater than 35 GPa.

The above tensile mechanical properties (Ar, $E_{RL20}$, $E_{RT20}$ and $E_{M20}$) are measured in a known manner using an Instron 4466 type tensile testing machine (BLUEHILL-2 software supplied with the tensile testing machine), according to standard ASTM D 638, on strips or monofilaments as manufactured, that is to say which have not been sized, or else sized (that is to say ready to use), or else extracted from the rubber or plastic article that they reinforce. Before measurement, these strips or these monofilaments are subjected to prior conditioning (storage for at least 24 hours in a standard atmosphere in accordance with European Standard DIN EN 20139 (temperature of 20±2° C.; relative humidity of 50±5%)). The samples tested are subjected to a tensile stress over an initial length of 400 mm at a nominal speed of 100 m/min, under a standard pretension of 0.5 cN/tex. All the results given are an average over 10 measurements.

Typically, the mineral material filaments (101) are present in the form of a single multifilament fibre or several multifilament fibres (if there are several, they are preferably essentially unidirectional), each of them being able to comprise several tens, hundreds or even thousands of unitary filaments. These very fine unitary filaments generally and preferably, in particular when they are made of glass, have a mean diameter of the order of 5 to 30 µm, more preferably from 10 to 20 µm. The mineral material filaments are themselves preferably orientated along the main axis X of the strip.

The term "resin" here is intended to mean the resin itself and any composition based on this resin and comprising at least one additive (that is to say one or more additives). The term "thermoset resin" or "crosslinked resin" is intended to mean, of course, that the resin is cured (photocured and/or thermoset), in other words is in the form of a network of three-dimensional bonds, in a state specific to "thermosetting" polymers (as opposed to "thermoplastic" polymers).

According to one particularly preferred embodiment, the real part of the complex modulus ($E'_{M150}$) of each monofilament, measured at 150° C. by the DMTA method, is greater than 25 GPa, preferably greater than 30 GPa.

According to another particularly preferred embodiment, for an optimized compromise between thermal and mechanical properties of the multicomposite strip of the invention, the $E'_{M(Tg1-25)}/E'_{M20}$ ratio is greater than 0.85, preferably greater than 0.90, $E'_{M20}$ and $E'_{M(Tg1-25)}$ being the real part of the complex modulus of each monofilament measured by DMTA, respectively at 20° C. and at a temperature expressed in ° C. equal to ($Tg_1$-25).

The measurements of E' are carried out in a known manner by DMTA ("Dynamic Mechanical Thermal Analysis"), with a "DMA+450" viscosity analyser from ACOEM (France), using the "Dynatest 6.83/2010" software to control the bending, tensile or torsion tests.

According to this device, since the three-point bending test does not make it possible in a known manner to enter the initial geometric data for a monofilament of cross section other than rectangular (for example circular or oblong), only the geometry of a rectangular (or square) cross section may be entered. In order to obtain a precise measurement of the modulus E' in the case of a monofilament of any cross section of thickness $T_M$, the convention is therefore to introduce into the software a square cross section with a side length "a" having the same surface moment of inertia, so as to be able to work with the same stiffness R of the test specimens tested.

The following well-known relationships must apply (E being the modulus of the material, $I_s$ the surface moment of inertia of the object in question, and * the multiplication symbol):

$$R = E_{composite} * I_{any\ cross\ section} = E_{composite} * I_{square\ cross\ section}$$

With for example here, for clarity of the disclosure, in the case of a circular cross section (diameter of the monofilament denoted $D_M$):

$$I_{circular\ cross\ section} = \pi * D_M^4 / 64 \text{ and}$$
$$I_{square\ cross\ section} = a^4 / 12$$

The value of the side length "a" of the equivalent square with the same surface inertia as that of the (for example, here circular) cross section of the monofilament of diameter $D_M$ is easily deduced therefrom, according to the equation:

$$a = D_M * (\pi/6)^{0.25}.$$

In the event that the cross section of the sample tested is neither circular nor rectangular, irrespective of the specific shape thereof, the same calculation method will be applied, with prior determination of the surface moment of inertia $I_s$ on a cross section of the sample tested.

The test specimen to be tested, generally of rectangular cross section and of thickness $T_M$, has a length of 35 mm. It is arranged horizontally on two supports 24 mm apart from one another. A repeated bending stress is applied at right angles to the centre of the test specimen, halfway between the two supports, in the form of a vertical displacement with an amplitude equal to 0.1 mm (thus an asymmetrical deformation, the interior of the test specimen being stressed solely in compression and not in extension) at a frequency of 10 Hz.

The following programme is then applied: under this dynamic stress, the test specimen is gradually heated from 25° C. to 260° C. with a ramp of 2° C./min. At the end of the test, measurements of the elastic modulus E', the viscous modulus E" and the loss angle ($\delta$) are obtained as a function of the temperature (where E' is the real part and E" the imaginary part of the complex modulus). It will be recalled here simply that the glass transition temperature may also be measured by DMTA; it corresponds to the maximum (peak) of tan ($\delta$).

According to a preferred embodiment, the compressive elastic deformation in bending of each monofilament is greater than 3.0%, more preferably greater than 3.5%, in particular greater than 4.0%. According to another preferred embodiment, the compressive breaking stress in bending of each monofilament is greater than 1000 MPa, more preferably greater than 1200 MPa, in particular greater than 1400 MPa.

The above compressive bending properties are measured on the monofilament as described in the aforementioned application EP 1 167 080 by the method referred to as the loop test (D. Sinclair, J. App. Phys. 21, 380, 1950). In the present case, a loop is produced and is brought gradually to its breaking point. The nature of the break, which is readily observable due to the large size of the cross section, makes it immediately possible to realize that the monofilament, stressed in bending until it breaks, breaks on the side where the material is in extension, which is identified by simple observation. Given that in this case the dimensions of the loop are large, it is possible at any time to read the radius of the circle inscribed in the loop. The radius of the circle inscribed just before the breaking point corresponds to the critical radius of curvature, denoted by Rc.

The following formula then makes it possible to determine, by calculation, the critical elastic deformation denoted Ec (where $T_M$ corresponds to the thickness of the monofilament):

$$Ec = (T_M/2) / [Rc + (T_M/2)]$$

The compressive breaking stress in bending, denoted $\sigma_c$, is obtained by the calculation using the following formula (where E is the initial tensile modulus):

$$\sigma_c = Ec * E$$

Since, in the preferred case, in particular in the more preferred case of a GRC monofilament, the loop breaks in the part in extension, it is concluded therefrom that, in bending, the compressive breaking stress is greater than the tensile breaking stress.

Flexural breaking of a rectangular bar by the method referred to as the three-point method (ASTM D 790) may also be carried out. This method also makes it possible to verify, visually, that the nature of the break is indeed in extension.

According to a preferred embodiment, the breaking stress in pure compression of each monofilament is greater than 700 MPa, more preferably greater than 900 MPa, in particular greater than 1100 MPa. To avoid buckling of the monofilament under compression, this quantity is measured according to the method described in the publication "*Critical compressive stress for continuous fiber unidirectional composites*" by Thompson et al., Journal of Composite Materials, 46(26), 3231-3245.

Preferably, in each monofilament, the degree of alignment of the mineral material filaments, in particular glass filaments, is such that more than 85% (% by number) of the filaments have an inclination relative to the axis of the monofilament which is less than 2.0 degrees, more preferably less than 1.5 degrees, this inclination (or misalignment) being measured as described in the above publication by Thompson et al.

Preferably, the weight content of fibres in each monofilament, in particular in each GRC monofilament, is between 60 and 80%, preferably between 65 and 75%.

This weight content is calculated from the ratio of the count of the initial fibre to the count of the monofilament. The count (or linear density) is determined on at least three samples, each corresponding to a length of 50 m, by weighing this length; the count is given in tex (weight in grams of 1000 m of product—as a reminder, 0.111 tex is equal to 1 denier).

Preferably, the density of each monofilament, in particular GRC monofilament, is between 1.8 and 2.1. It is measured (at 23° C.) by means of a specialized balance from Mettler Toledo of the "PG503 DeltaRange" type; the samples, of a few cm, are successively weighed in air and immersed in ethanol, then the software of the apparatus determines the mean density over three measurements.

Preferably, the mineral multifilament fibres are selected from glass fibres, carbon fibres, boron fibres, ceramic fibres (encompassing oxide fibres such as silica or alumina fibres, and non-oxide fibres such as silicon carbide fibres), and mixtures of such fibres.

In other words, the constituent mineral material of the monofilaments is preferably selected from glass, carbon, boron and ceramic. More preferably, the mineral material is glass for the manufacture of GRC (abbreviation for glass-resin composite) monofilaments.

The initial resin used is, by definition, a crosslinkable (i.e. curable) resin which is capable of being crosslinked, cured by any known method, in particular by UV (or UV-visible) radiation, preferably emitting in a spectrum ranging at least from 300 nm to 450 nm.

As crosslinkable resin, use is preferably made of a polyester or vinyl ester resin, more preferably a vinyl ester resin. The term "polyester" resin is intended to mean, in a known way, a resin of unsaturated polyester type. As for vinyl ester resins, they are well known in the field of composite materials.

Without this definition being limiting, the vinyl ester resin is preferably of the epoxy vinyl ester type. Use is more preferably made of a vinyl ester resin, in particular of the epoxide type, which, at least in part, is based on novolac (also known as phenoplast) and/or bisphenol (that is to say is grafted onto a structure of this type), or preferably a vinyl ester resin based on novolac, bisphenol, or novolac and bisphenol.

An epoxy vinyl ester resin based on novolac (the part between brackets in Formula I below) corresponds for example, in a known way, to the following Formula (I):

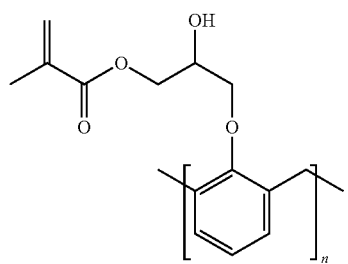
(I)

An epoxy vinyl ester resin based on bisphenol A (the part between brackets in Formula (II) below) corresponds for example to the formula (the "A" serving as a reminder that the product is manufactured using acetone):

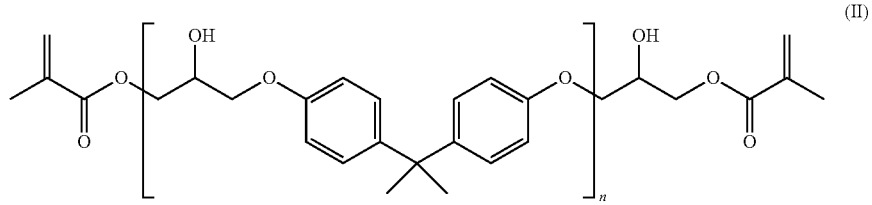
(II)

An epoxy vinyl ester resin of novolac and bisphenol type has demonstrated excellent results. By way of example of such a resin, mention may especially be made of the vinyl ester resins Atlac 590 and E-Nova FW 2045 from DSM (diluted with approximately 40% styrene). Epoxy vinyl ester resins are available from other manufacturers such as, for example, AOC (USA—"Vipel" resins).

Preferably, in the multicomposite reinforcer of the invention, the initial tensile modulus of the thermoset resin, measured at 20° C., is greater than 3.0 GPa, more preferably greater than 3.5 GPa.

Preferred GRC monofilaments, which may be used for manufacturing of the strip of the invention, are well known; they may be prepared according to known processes preferably comprising at least the following steps:

- creating a rectilinear arrangement of glass fibres (filaments) and conveying this arrangement in a feed direction;
- in a vacuum chamber, degassing the arrangement of fibres by the action of the vacuum;
- at the outlet of the vacuum chamber, after degassing, passing through an impregnation chamber under vacuum so as to impregnate said arrangement of fibres with a thermosetting resin or resin composition, in the liquid state, in order to obtain a prepreg containing the glass filaments and the resin;
- passing said prepreg through a sizing die having a cross section of predefined area and shape, to provide it with a shape of a flat monofilament (for example a monofilament with a rectangular or oblong cross section);
- downstream of the die, in a UV irradiation chamber, polymerizing the resin under the action of the UV rays;
- then winding the monofilament obtained in this way, for intermediate storage.

All the above steps (arranging, degassing, impregnating, sizing, polymerizing and final winding) are steps which are well known to those skilled in the art, as well as the materials (multifilament fibres and resin compositions) used; they have been described, for example, in the applications EP-A-1 074 369 and EP-A-1 174 250.

It will be recalled especially that before any impregnation of the fibres, a step of degassing the arrangement of fibres by the action of the vacuum is preferably carried out, in order especially to boost the effectiveness of the later impregnation, and above all to guarantee the absence of bubbles within the finished composite monofilament.

After passing through the vacuum chamber, the glass filaments enter an impregnation chamber which is completely full of impregnation resin, and therefore devoid of air: this is how this impregnation step can be described as "impregnation under vacuum".

The impregnation resin (resin composition) preferably comprises a photoinitiator which is sensitive (reactive) to UV rays above 300 nm, preferably between 300 and 450 nm. This photoinitiator is used at an amount preferably of from 0.5% to 3%, more preferably from 1% to 2.5%. The resin may also comprise a crosslinking agent, for example at an amount of between 5% and 15% (% by weight of impregnation composition).

Preferably, this photoinitiator is from the family of phosphine compounds, more preferably a bis(acyl)phosphine oxide, such as for example bis(2,4,6-trimethylbenzoyl)phenylphosphine oxide ("Irgacure 819" from BASF) or a mono (acyl)phosphine oxide (for example "Esacure TPO" from Lamberti), such phosphine compounds being able to be used in a mixture with other photoinitiators, for example photoinitiators of the alpha-hydroxy ketone type, such as for example dimethylhydroxyacetophenone (e.g. "Esacure KL200" from Lamberti) or 1-hydroxycyclohexyl phenyl ketone (e.g. "Esacure KS300" from Lamberti), benzophenones such as 2,4,6-trimethylbenzophenone (e.g. "Esacure TZT" from Lamberti) and/or thioxanthone derivatives such as, for example, isopropylthioxanthone (e.g. "Esacure ITX" from Lamberti).

The "sizing" die makes it possible, by having a cross section of determined dimensions, generally and preferably rectangular or oblong, to adjust the proportion of resin with respect to the glass fibres while at the same time imposing on the prepreg the shape and thickness required for the finished monofilament.

The polymerization or UV irradiation chamber then has the function of polymerizing and crosslinking the resin under the action of the UV rays. It comprises one or preferably several UV irradiators, each composed for example of a UV lamp with a wavelength of 200 to 600 nm.

The final GRC monofilament thus formed through the UV irradiation chamber, in which the resin is now in the solid state, is then recovered for example on a take-up reel, on which it may be wound over a very great length.

Between the sizing die and the final receiving support, it is preferred to keep the tensions to which the glass fibres are subjected at a moderate level, preferably between 0.2 and 2.0 cN/tex, more preferably between 0.3 and 1.5 cN/tex; in order to control this, it will be possible for example to measure these tensions directly at the outlet of the irradiation chamber, by means of suitable tension meters well known to those skilled in the art.

Finally, a finished, manufactured composite block as depicted in FIG. 1 is obtained, in the form of a continuous GRC monofilament (10) of thickness or $T_M$, having a very long length relative to its cross section (in this example rectangular cross section), the unitary glass filaments (101) of which are distributed homogeneously throughout the volume of cured resin (102).

FIG. 4 represents another possible example of a finished, manufactured composite block, this time in the form of a continuous GRC monofilament (20) of thickness $T_M$, the cross section of which is not rectangular (in this example oblong), based on unitary glass filaments (101) embedded in the cured resin (102).

Advantageously, before deposition of the sheath of thermoplastic material (12), the monofilaments (10, 20) may be subjected to an adhesion treatment in order to improve the subsequent adhesion between the thermoset resin (102) described above and the thermoplastic sheath (12). A suitable chemical treatment could, for example, consist of a prior passage through an aqueous bath based on epoxy resin and/or isocyanate compound, followed by at least one heat treatment that aims to eliminate the water and polymerize the adhesive layer. Such adhesion treatments are well known to a person skilled in the art.

Once the monofilaments (10, 20) have been manufactured, then positioned in parallel side-by-side in the main direction (X), the latter are sheathed together, covered with a layer of thermoplastic material (12), as illustrated for example in FIGS. 2, 3 and 5 which will be commented upon in greater detail below.

This step of coating or covering with the thermoplastic material is carried out in a manner known by those skilled in the art. For example it consists in passing the composite monofilaments through one or more dies of suitable diameter, through extrusion heads heated to suitable temperatures, or else through a coating bath containing the thermoplastic material previously dissolved in a suitable organic solvent (or mixture of solvents).

On exiting the extruder, the filaments thus coated, sheathed by the thermoplastic material are then cooled sufficiently so as to solidify the layer of thermoplastic material, for example with air or another cold gas, or by passing through a water bath, followed by a drying step.

By way of example, covering a series of 4 parallel GRC monofilaments of rectangular cross section, having width and thickness respectively close to 1.5 mm and 0.3 mm, with a layer of PET of minimal thickness $e_{min}$ equal to around 0.15 mm, in order to obtain a multicomposite strip having a width of around 10 mm and a thickness of around 0.6 mm, is carried out on an extrusion-sheathing line comprising for example two rectangular sizing dies, a first die (counter-die or upstream die) having a width equal to around 11 mm and a height equal to around 0.65 mm and a second die (or downstream die) of slightly larger dimensions (for example width of 12 mm and height of 0.70 mm), both positioned in an extrusion head brought to around 290° C. These two sizing dies make it possible, owing to a cross section of determined dimensions, to adjust the proportion of thermoplastic material relative to the composite material monofilaments, imposing on the multicomposite strip the targeted final shape and thickness.

The polyester, which melts at a temperature of 280° C. in the extruder, thus covers the GRC flat monofilaments, previously separated upstream through a comb and arranged in an appropriate manner, by means of the sheathing head, at a run speed of the monofilaments typically equal to several tens of m/min, for an extrusion pump rate typically of several tens of cm³/min. Next in this sheathing, the strip obtained may be immersed in a cooling tank filled with cold water, in order to solidify and set the polyester in its amorphous state, then dried for example in-line by an air nozzle, or by passing the take-up reel into the oven.

The layer or sheath covering the monofilaments (10) made of GRC or other mineral material therefore consists of a thermoplastic material (12) of which the glass transition temperature ($Tg_2$) is preferably greater than −30° C., more preferably greater than 20° C., more preferably still greater than 50° C., in particular greater than 70° C. Moreover, the melting temperature (denoted Tm) of this thermoplastic material (12) is preferably greater than 100° C., more preferably greater than 150° C., in particular greater than 200° C.

Preferably, the minimal thickness (denoted $e_{min}$) of the layer of thermoplastic material covering each monofilament (measured "at the back" of each monofilament), is between 0.05 and 0.5 mm, more preferably between 0.1 and 0.4 mm, in particular between 0.1 and 0.3 mm.

Preferably, the initial tensile modulus of this thermoplastic material (12) is between 300 and 3000 MPa, more preferably between 500 and 2500 MPa, in particular between 500 and 2000 MPa; its elastic elongation is preferably greater than 5%, more preferably greater than 8%, in particular greater than 10%; its elongation at break is preferably greater than 10%, more preferably greater than 15%, in particular greater than 20%.

Typically, the thermoplastic material is a polymer or a polymeric composition (composition based on at least one polymer and on at least one additive).

This thermoplastic polymer is preferably selected from the group consisting of polyamides, polyesters and polyimides and mixtures of such polymers, more particularly from the group consisting of polyesters, polyetherimides and mixtures of such polymers.

Mention may in particular be made, among the aliphatic polyamides, of the polyamides PA-4,6, PA-6, PA-6,6, PA-11 or PA-12. The thermoplastic polymer is more preferably a polyester; among the polyesters, mention may be made, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate). According to another more preferred embodiment, the thermoplastic polymer is a polyetherimide (PEI), for example the product "ULTEM 1000" from GE Plastics.

Various additives such as a dye, filler, plasticizer, antioxidant or other stabilizer may be optionally added to the above polymer or mixture of polymers in order to form a polymeric composition. Compatible components, preferably themselves thermoplastic, capable of promoting the adhesion to a diene rubber matrix, for example TPS (thermoplastic styrene) elastomers of unsaturated type, especially that are epoxidized, as described for example in applications WO 2013/117474 and WO 2013/117475, could advantageously be added to the above thermoplastic material.

According to one preferred embodiment, the sheath (12) comprises a single thermoplastic material. As a variant, the sheath (12) could however comprise several different thermoplastic materials.

As thermoplastic polymer, use could also be made of thermoplastic elastomers (TPEs), especially TPS elastomers, whether saturated or unsaturated, as described for example in applications WO 2010/136389, WO 2010/105975, WO 2011/012521, WO 2011/051204, WO 2012/016757, WO 2012/038340, WO 2012/038341, WO 2012/069346, WO 2012/104279, WO 2012/104280 and WO 2012/104281, or else mixtures of non-elastomeric polymers as described above and such thermoplastic elastomers.

It will be recalled here that the thermoplastic elastomers (for example thermoplastic styrene elastomers), having a structure intermediate between thermoplastic polymers and elastomers, are made up, as is known, from thermoplastic (for example polystyrene) hard sequences linked by elastomer soft sequences, for example polybutadiene, polyisoprene or poly(ethylene/butylene) sequences. This is why, as is known, the TPE or TPS copolymers are generally characterized by the presence of two glass transition peaks, the first peak (the lower, generally negative temperature) relating to the elastomer sequence of the copolymer and the second peak (the higher, generally and preferably positive temperature, corresponding to $Tg_2$) relating to the thermoplastic (for example styrene blocks) part of the copolymer.

$Tg_1$, $Tg_2$ are measured in a known manner by DSC (Differential Scanning calorimetry), at the second pass, for example, and unless otherwise indicated in the present application, according to standard ASTM D3418 of 1999 ("822-2" DSC apparatus from Mettler Toledo; nitrogen atmosphere; samples first brought from ambient temperature (20° C.) to 250° C. (10° C./min), then rapidly cooled (quenching) down to a temperature preferably at least 50° C. below the temperature Tg in question (for example down to 20° C.), before final recording of the DSC curve from this quenching temperature (for example 20° C.) up to 250° C., at a ramp of 10° C./min).

FIG. 2 depicts, in cross section, an example (R1) of multicomposite strip in accordance with the invention, in which a series (for example 4) of GRC flat monofilaments (10a, 10b, 10c, 10d, 10e) as described above, for example having width and thickness respectively close to 1.5 mm and 0.3 mm, has been covered by its layer, sheath of thermoplastic material, for example made of PET, having a minimal thickness $e_{min}$ (for example equal to around 0.15 mm) measured at the back of each monofilament.

In this example, the cross section of each monofilament is rectangular. These monofilaments are positioned substantially in a same plane (X, Y), aligned in parallel along the main direction (X). The thickness, denoted $T_R$, of this strip R1 of the invention, equal to $T_M+2\ e_{min}$, is therefore equal to around 0.6 mm in this example. Its width, denoted $W_R$, is for example equal to 10 mm, the ratio $W_R/T_R$ thus being equal to around 17.

FIG. 3 depicts, in cross section, another example (R2) of multicomposite strip in accordance with the invention, in which a series of monofilaments (10a, 10b, 10c, 10d, 10e, etc.), for example having a thickness equal to 0.3 mm, has been covered by its layer, sheath of thermoplastic material, for example made of PET, having a minimal thickness $e_{min}$ (for example equal to around 0.15 mm) measured at the back of each monofilament.

In this example, the cross section of each monofilament is rectangular. These monofilaments are positioned this time in "staggered rows" (offset from one to the next in the Z direction), aligned in parallel along the main direction (X). The thickness, denoted $T_R$, of this strip R1 of the invention, greater than $T_M+2\ e_{min}$, is for example equal to around 1.1 mm in this example. Its width, denoted $W_R$, is for example equal to 20 mm, the ratio $W_R/T_R$ thus being equal to around 18.

FIG. 5 depicts, in cross section, another example (R3) of multicomposite strip in accordance with the invention, in which a series (for example between 3 and 15) of monofilaments (20a, 20b, 20c, 20d, 20e, etc.), for example having a thickness equal to 0.6 mm, has been covered by its layer, sheath of thermoplastic material, for example made of PET, having a minimal thickness $e_{min}$ (for example equal to around 0.2 mm) measured at the back of each monofilament.

In this example, the cross section of each monofilament is substantially oblong. These monofilaments are positioned substantially in a same plane (X, Y), aligned in parallel along the main direction (X). The thickness $T_R$ of this strip R1 of the invention, equal to $T_M+2\ e_{min}$, is therefore equal to around 1.0 mm in this example.

Owing to the combined presence of its filaments of mineral material such as glass, its thermosetting matrix and the thermoplastic sheath fulfilling in a way a hooping function ("deformation limiter") of the monofilaments, the multicomposite strip of the invention is characterized by an improved transverse cohesion, and a high dimensional, mechanical and thermal stability.

Preferably, in the multicomposite strip of the invention, the monofilaments are not contiguous in the plane (Y, Z) of the cross section of the strip, so that they can deform and work in an optimal manner with respect to one another in the thermoplastic matrix, in bending, compression and/or shear.

More preferably, as illustrated by way of examples in FIGS. 2, 3 5, the monofilaments are separated, in twos, by an average distance, denoted "d", measured in this plane (Y, Z), such that the ratio $d/W_M$ is between 0.1 and 3. The average distance "d" it is of course understood to mean the average calculated over the total number of the monofilaments (10a, 10b, 10, 10d, 10e, etc.; 20a, 20b, 20c, 20d, 20e, etc.) present in the strip of the invention, this average itself being averaged over 10 successive cross sections of the strip of the invention, at least 10 cm away from one another.

If $d/W_M$ is less than 0.1, there is a risk of being exposed to a certain lack of flexibility, especially in transverse shear, of the strip whereas if $d/W_M$ is greater than 3, a lack of uniformity of the deformation in bending and/or compression may appear. For these reasons, the ratio $d/W_M$ is more preferably between 0.2 and 2, more preferably still between 0.5 and 1.5, particularly in the case of the reinforcement of a vehicle tyre.

The number of monofilaments, in the strip of the invention, is preferably in a range from 2 to 40, more preferably from 3 to 30, more preferably still from 4 to 20, especially in the case of the reinforcement of a vehicle tyre.

Preferably, as illustrated in FIGS. 2, 3 and 5, the minimal thickness ($e_{min}$) of the layer of thermoplastic material covering each monofilament (therefore measured "at the back" of each monofilament) at the periphery of the reinforcer, is between 0.05 and 0.5 mm, preferably between 0.1 and 0.4 mm. This thickness ($e_{min}$) is of course the average thickness calculated over the total number of the monofilaments present in the strip of the invention, this average itself being averaged over 10 different cross sections of the composite strip of the invention, by convention at least 10 cm away from one another.

The invention also relates to a multilayer laminate comprising at least one multicomposite reinforcer according to the invention as described above, positioned between and in contact with two layers of rubber or elastomer, especially diene rubber or elastomer, composition.

In the present application, in a known manner, the following definitions apply:
  "laminate" or "multilayer laminate", within the meaning of the International Patent Classification: any product comprising at least two layers, of flat or non-flat form, which are in contact with one another, the latter possibly or possibly not being joined or connected together; the expression "joined" or "connected" should be interpreted broadly so as to include all means of joining or assembling, in particular via adhesive bonding;
  "diene" rubber: any elastomer (single elastomer or mixture of elastomers) that results, at least in part (i.e., a homopolymer or a copolymer), from diene monomers, i.e. from monomers bearing two carbon-carbon double bonds, whether the latter are conjugated or non-conjugated.

FIG. 6 represents an example of such a multilayer laminate (30) comprising a multicomposite strip (R1), consisting of a series of GRC monofilaments (10a, 10b, 10c, 10d, 10e, etc.) as depicted in the preceding FIG. 1, embedded in their thermoplastic sheath (12), this multicomposite strip according to the invention (R1) itself being positioned between and in contact with two layers (14a, 14b) of rubber (for example diene elastomer) compositions having identical or different formulations, in order to constitute the final multilayer laminate in accordance with the invention (30).

This light and efficient multilayer laminate, which is resistant to corrosion, makes it possible to advantageously replace the conventional plies reinforced by steel cords.

Owing in addition to the presence of a significant amount of thermoplastic material replacing the rubber, this laminate of the invention additionally has the advantage of having a low hysteresis compared to these conventional fabrics. Yet, a major objective of manufacturers of pneumatic tyres is also to lower the hysteresis of the constituents thereof in order to reduce the rolling resistance of these tyres.

Among all the advantages of the multilayer laminate of the invention, mention may also be made of the fact that the thermoplastic sheath (12) has a stiffness intermediate between the stiffness of the monofilaments (10) and the stiffness of the rubber matrix (14a, 14b). Since the stiffness between the monofilaments and the rubber matrix is therefore less discontinuous than in the absence of a sheath (12), this reduces the stresses exerted at the interfaces and improves the overall endurance of the multilayer laminate.

Each layer of rubber composition, or hereinbelow "rubber layer", which is a constituent of the multilayer laminate of the pneumatic tyre of the invention is based on at least one elastomer, preferably of diene type.

This diene elastomer is preferably selected from the group consisting of polybutadienes (BRs), natural rubber (NR), synthetic polyisoprenes (IRs), various butadiene copolymers, various isoprene copolymers and mixtures of these elastomers, such copolymers being especially selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

One particularly preferred embodiment consists in using an "isoprene" elastomer, that is to say an isoprene homopolymer or copolymer, in other words a diene elastomer selected from the group consisting of natural rubber (NR), synthetic polyisoprenes (IRs), various isoprene copolymers and mixtures of these elastomers. The isoprene elastomer is preferably natural rubber or a synthetic polyisoprene of the cis-1,4 type. Among these synthetic polyisoprenes, use is preferably made of polyisoprenes having a content (mol %) of cis-1,4-bonds of greater than 90%, more preferably still greater than 98%. According to one preferred embodiment, each layer of rubber composition contains 50 to 100 phr of natural rubber. According to other preferred embodiments, the diene elastomer may consist, in full or in part, of another diene elastomer such as, for example, an SBR elastomer used as a blend with another elastomer, for example of the BR type, or used alone.

The rubber composition may contain a single diene elastomer or several diene elastomers, the latter possibly being used in combination with any type of synthetic elastomer other than a diene elastomer, or even with polymers other than elastomers. The rubber composition may also comprise all or some of the additives customarily used in the rubber matrices intended for the manufacture of tyres, such as for example reinforcing fillers such as carbon black or silica, coupling agents, anti-ageing agents, antioxidants, plasticizing agents or extender oils, whether the latter are of aromatic or non-aromatic nature, plasticizing resins with a high glass transition temperature, processing aids, tackifying resins, anti-reversion agents, methylene acceptors and donors, reinforcing resins, a crosslinking or vulcanization system.

Preferably, the system for crosslinking the rubber composition is a system referred to as a vulcanization system, that is to say one based on sulphur (or on a sulphur donor agent) and a primary vulcanization accelerator. Various known vulcanization activators or secondary accelerators may be added to this basic vulcanization system. Sulphur is used at a preferred content of between 0.5 and 10 phr, and the primary vulcanization accelerator, for example a sulphenamide, is used at a preferred content of between 0.5 and 10 phr. The content of reinforcing filler, for example of carbon black or silica, is preferably greater than 50 phr, especially between 50 and 150 phr.

All carbon blacks, in particular blacks of the HAF, ISAF or SAF type, conventionally used in tyres ("tyre-grade" blacks), are suitable as carbon blacks. Among the latter, more particular mention will be made of carbon blacks of 300, 600 or 700 (ASTM) grade (for example N326, N330, N347, N375, N683, N772). Precipitated or fumed silicas having a BET surface area of less than 450 $m^2/g$, preferably from 30 to 400 $m^2/g$, are notably suitable as silicas.

A person skilled in the art will know, in light of the present description, how to adjust the formulation of the rubber composition in order to achieve the desired levels of properties (especially modulus of elasticity), and to adapt the formulation to the specific application envisaged.

Preferably, the rubber composition has, in the crosslinked state, a secant tensile modulus, at 10% elongation, which is between 4 and 25 MPa, more preferably between 4 and 20 MPa; values in particular between 5 and 15 MPa have proved to be particularly suitable for reinforcing the belts of pneumatic tyres. Modulus measurements are carried out in tensile tests, unless otherwise indicated in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with the standard ASTM D 1349 of 1999).

According to one preferred embodiment, in the multilayer laminate of the invention, the thermoplastic layer (12) is provided with an adhesive layer facing each layer of rubber composition with which it is in contact.

In order to adhere the rubber to this thermoplastic material, use could be made of any appropriate adhesive system, for example a simple textile adhesive of the "RFL" (resorcinol-formaldehyde-latex) type comprising at least one diene elastomer such as natural rubber, or any equivalent adhesive known for imparting satisfactory adhesion between rubber and conventional thermoplastic fibres such as polyester or polyamide fibres, such as for example the adhesive compositions described in the applications WO 2013/017421, WO 2013/017422, WO 2013/017423.

By way of example, the adhesive coating process may essentially comprise the following successive steps: passage through a bath of adhesive, followed by drainage (for example by blowing, grading) to remove the excess adhesive; then drying, for example by passing into an oven or heating tunnel (for example for 30 s at 180° C.) and finally heat treatment (for example for 30 s at 230° C.).

Before the above adhesive coating process, it may be advantageous to activate the surface of the thermoplastic material, for example mechanically and/or physically and/or chemically, to improve the adhesive uptake thereof and/or the final adhesion thereof to the rubber. A mechanical treatment could consist, for example, of a prior step of matting or scratching the surface; a physical treatment could consist, for example, of a treatment via radiation such as an electron beam; a chemical treatment could consist, for example, of prior passage through a bath of epoxy resin and/or isocyanate compound.

Since the surface of the thermoplastic material is, as a general rule, smooth, it may also be advantageous to add a thickener to the adhesive used, in order to improve the total uptake of adhesive by the multicomposite reinforcer during the adhesive coating thereof.

A person skilled in the art will easily understand that the connection between the thermoplastic polymer layer of the multicomposite reinforcer of the invention and each rubber layer with which it is in contact in the multilayer laminate of the invention is ensured definitively during the final curing (crosslinking) of the rubber article, especially tyre, for which the laminate is intended.

5. EXEMPLARY EMBODIMENTS OF THE INVENTION

Examples of the manufacture of GRC monofilaments, then of multicomposite strips and of multilayer laminates according to the invention based on these GRC monofilaments, and the use thereof as reinforcing elements in pneumatic tyres will be described hereinafter.

Appended FIG. 7 schematically illustrates in a very simple manner an example of a device 100 which makes possible the production of monofilaments (10) as schematically illustrated in FIG. 1.

In this figure, a reel 110 can be seen, containing, in the example illustrated, glass fibres 111 (in the form of multifilaments 101). The reel is unwound continuously by conveying so as to produce a rectilinear arrangement 112 of these fibres 111. In general, the reinforcing fibres are delivered in "rovings", that is to say already in groups of fibres wound in parallel onto a reel; for example, fibres sold by Owens Corning under the fibre name "Advantex" are used, with a count equal to 1200 tex (as a reminder, 1 tex=1 g/1000 m of fibre). It is for example the tension exerted by the rotating receiver 126 which will enable the fibres to advance in parallel and enable the GRC monofilament to advance along the entire length of the equipment 100.

This arrangement 112 then passes through a vacuum chamber 113 (connected to a vacuum pump, not shown), arranged between an inlet tubing 113a and an outlet tubing 113b which opens into an impregnation chamber 114, the two tubings preferably with rigid walls having, for example, a minimal cross section greater than (typically twice as large as) the total cross section of the fibres and a length very much greater than (typically 50 times greater than) said minimal cross section.

As already taught by the aforementioned application EP-A-1 174 250, the use of tubings with rigid walls both for the inlet opening into the vacuum chamber and for the outlet opening of the vacuum chamber and the transfer from the vacuum chamber to the impregnation chamber proves to be compatible at the same time with high passage rates of the fibres through the openings without breaking the fibres, and also makes it possible to ensure sufficient sealing.

All that is required, if need be experimentally, is to find the largest flew cross section, given the total cross section of the fibres to be treated, that will still allow sufficient sealing to be achieved, given the rate of advance of the fibres and the length of the tubings. Typically, the vacuum inside the chamber 113 is, for example, of the order of 0.1 bar, and the length of the vacuum chamber is approximately 1 metre.

On exiting the vacuum chamber 113 and the outlet tubing 113b, the arrangement 112 of fibres 111 passes through an impregnation chamber 114 comprising a feed tank 115 (connected to a metering pump, not depicted) and a sealed impregnation tank 116 completely full of impregnation composition 117 based on a curable resin of the vinyl ester type (e.g. "E-Nova FW 2045" from DSM). By way of example, the composition 117 further comprises (in a weight content of 1 to 2%) a photoinitiator suitable for UV and/or UV-visible radiation with which the composition will subsequently be treated, for example bis(2,4,6-trimethylbenzoyl)phenylphosphine oxide ("Irgacure 819" from BASF). It may also comprise (for example approximately 5% to 15% of) a crosslinking agent such as, for example, tris(2-hydroxyethyl)isocyanurate triacrylate ("SR 368" from Sartomer). Of course, the impregnation composition 117 is in the liquid state.

Preferably, the impregnation chamber is several metres long, for example between 2 and 10 m, in particular between 3 and 5 m.

Thus, a prepreg which comprises for example (in % by weight) from 65% to 75% solid fibres 111, the remainder (25% to 35%) being formed of the liquid impregnation matrix 117, leaves the impregnation chamber 114 in a sealed outlet tubing 118 (still under rough vacuum).

The prepreg then passes through sizing means 119 comprising at least one sizing die 120, the passage of which (not depicted here), for example of rectangular or oblong shape, is suited to the specific embodiment conditions. By way of example, this passage has a minimal cross section of rectangular shape, the downstream orifice of which has dimensions (width and height) slightly greater than those of the targeted monofilament. Said die has a length which is typically at least 100 times greater than the minimum dimension of the minimal cross section. Its purpose is to give the finished product good dimensional accuracy, and may also serve to meter the fibre content with respect to the resin. According to one possible alternative form of embodiment, the die 120 can be directly incorporated into the impregnation chamber 114, thereby for example avoiding the need to use the outlet tubing 118.

Preferably, the sizing zone is several centimetres long, for example between 5 and 50 cm, in particular between 5 and 20 cm.

By virtue of the sizing means (119, 120) a "liquid" composite monofilament (121), liquid in the sense that its impregnation resin is still liquid at this stage, is obtained at this stage, the shape of the cross section of which is preferably essentially rectangular or oblong.

At the outlet of the sizing means (119, 120), the liquid composite monofilament (121) obtained in this way is then polymerized by passing through a UV irradiation chamber (122) comprising a sealed glass tube (123) through which the composite monofilament moves; said tube, the diameter of which is typically a few cm (for example 2 to 3 cm), is irradiated by a plurality of (here, for example, 4) UV irradiators (124) in a row ("UVAprint" lamps from Dr. Hönle, with a wavelength of 200 to 600 nm) arranged at a short distance (a few cm) from the glass tube. Preferably, the irradiation chamber is several metres long, for example between 2 and 15 m, in particular between 3 and 10 m. The irradiation tube 123 in this example has a stream of nitrogen flowing through it.

The irradiation conditions are preferably adjusted such that, at the outlet of the impregnation chamber, the temperature of the GRC monofilament measured at the surface thereof (for example by means of a thermocouple) is greater than the Tg ($Tg_1$) of the crosslinked resin and more preferably less than 270° C.

Once the resin has polymerized (cured), the GRC monofilament (125) which is now in the solid state and conveyed in the direction of the arrow F then arrives at the final take-up reel thereof (126). Finally, a finished, manufactured composite block as depicted in FIG. 1 is obtained, in the form of a continuous, very long GRC monofilament (10), the unitary glass filaments (101) of which are distributed homogeneously throughout the volume of cured resin (102). Its thickness and its width are for example equal to around to 0.3 and 1.5 mm. The process described above may be implemented at high speed, preferably greater than 50 m/min, for example between 50 and 150 m/min.

The GRC monofilaments thus obtained are then subjected to an adhesive coating operation by passing through an aqueous bath (around 94% of water) essentially based on epoxy resin ("DENACOL" EX-512 polyglycerol polyglycidyl ether from Nagase ChemteX Corporation, around 1%) and on isocyanate compound ("GRILBOND" IL-6 caprolactam-blocked isocyanate compound from EMS, around 5%), which adhesive coating step is followed by drying (30 s at 185° C.) then a heat treatment (30 s at 200° C.).

Thus adhesive coated then assembled as bundles of parallel fibres (reel-winding system provided for several reels), the monofilaments for example 4 thereof are inserted into a "wire guide", equipped with a tension regulator, before fitting in an extrusion head; they are then subjected to an operation for sheathing with the thermoplastic material (12), in this case a PET ("Artenius Design+" from Artenius; density >1.39; $Tg_2$ equal to around 76° C.; Tm equal to around 230° C.) by passing (10 m/min) through an extrusion head ("Nextrom" NMC45-24D extruder, brought to 290° C.). The cooling takes place by passing through a bath of cold water at the outlet of the extruder.

The multicomposite strip of the invention thus obtained, as depicted for example in the preceding FIG. 2, had the following final properties:

$T_M$ equal to around 0.3 mm; $W_M$ equal to around 1.5 mm; $e_{min}$ equal to around 0.15 mm; $T_R$ equal to around 0.6 mm; $W_R$ equal to around 10 mm; "d" equal to around 0.8 mm; $Tg_1$ equal to around 180° C.; $Tg_2$ equal to around 76° C.; Ar equal to around 3.8%; $E_{RL20}$ equal to around 14 GPa; $E_{RT20}$ equal to around 1800 MPa; $E_{M20}$ equal to around 34 GPa; $E'_{150}$ equal to around 30 GPa; $E'_{(Tg1-25)}E'_{20}$ equal to around 0.92; compressive elastic deformation in bending of each monofilament equal to around 3.6%; compressive breaking stress in bending of each monofilament equal to around 1350 MPa; weight content of glass fibres in each monofilament equal to around 70%; initial tensile modulus of the thermoset vinyl ester resin, at 20° C., equal to around 3.6 GPa; initial tensile modulus of the PET (at 20° C.) equal to around 1100 MPa; elastic elongation of the PET (at 20° C.) greater than 5%; elongation at break of the PET (at 20° C.) greater than 10%.

The multicomposite strip of the invention manufactured in this way can advantageously be used, especially in the form of a multilayer laminate in accordance with the invention, for reinforcing pneumatic or non-pneumatic tyres of all types of vehicles, in particular passenger vehicles or industrial vehicles such as heavy vehicles, civil engineering vehicles, aircraft and other transport or handling vehicles.

As an example, FIG. 8 illustrates, highly schematically (without being true to a specific scale) a radial section through a pneumatic tyre, that is or is not in accordance with the invention in this general representation.

This pneumatic tyre 200 comprises a crown 202 reinforced by a crown reinforcement or belt 206, two sidewalls 203 and two beads 204, each of these beads 204 being reinforced with a bead wire 205. The crown 202 is surmounted by a tread, not shown in this schematic figure. A carcass reinforcement 207 is wound around the two bead wires 205 in each bead 204, the turn-up 208 of this reinforcement 207 being, for example, positioned towards the outside of the tyre 200, which is here represented fitted onto its wheel rim 209. Of course, this pneumatic tyre 200 additionally comprises, in a known way, a layer of rubber 201 commonly referred to as an airtight rubber or layer, which defines the radially inner face of the tyre and which is intended to protect the carcass ply from the diffusion of air originating from the space interior to the pneumatic tyre.

The carcass reinforcement 207, in the tyres of the prior art, is generally formed from at least one rubber ply reinforced by what are referred to as "radial" textile or metal reinforcers, that is to say these reinforcers are arranged practically parallel to one another and extend from one bead to the other to form an angle of between 80° and 90° with the median circumferential plane (plane perpendicular to the axis of rotation of the tyre, which is situated halfway between the two beads 204 and passes through the middle of the crown reinforcement 206).

The belt 206 is for example formed, in the tyres of the prior art, of at least two superposed and crossed rubber plies known as "working plies" or "triangulation plies", reinforced with metal cords positioned substantially parallel to one another and inclined relative to the median circumferential plane, it being possible for these working plies to optionally be combined with other rubber fabrics and/or plies. The primary role of these working plies is to give the pneumatic tyre a high cornering stiffness. The belt 206 may also comprise, in this example, a rubber ply referred to as a "hooping ply", reinforced by what are referred to as a "circumferential" reinforcing threads, that is to say these reinforcing threads are arranged practically parallel to one another and extend substantially circumferentially around the pneumatic tyre so as to form an angle preferably within a range from 0° to 10° with the median circumferential plane. The role of these reinforcing threads is in particular to withstand the centrifugation of the crown at high speed.

A pneumatic tyre 200, when it is in accordance with the invention, has the preferential feature that at least its belt (206) and/or its carcass reinforcement (207) comprises a multilayer laminate according to the invention, consisting of at least one multicomposite strip according to the invention positioned between and in contact with two layers of diene rubber composition.

According to one particular embodiment of the invention, this multicomposite strip of the invention may be used between and in contact with two layers of rubber composition, the multilayer laminate according to the invention thus obtained very advantageously making it possible to be able to replace the two triangulation (working) crown plies, or even the two triangulation plies and the hooping crown ply.

According to another possible exemplary embodiment of the invention, it is the bead zone that may be reinforced with such a multicomposite reinforcer; it is for example the bead wires (5) that could be formed, in whole or in part, of a multicomposite reinforcer according to the invention.

In these examples from FIG. 8, the rubber compositions used for the multilayer laminates according to the invention are for example conventional compositions for calendering textile reinforcers, typically based on natural rubber, carbon black or silica, a vulcanization system and the usual additives. By virtue of the invention, compared to rubber compositions reinforced with steel cords, the compositions advantageously have no metal salts such as cobalt salts. The adhesion between the multicomposite strip of the invention and the rubber layer that coats it may be provided in a simple and known manner, for example by a standard adhesive of RFL (resorcinol-formaldehyde-latex) type, or with the aid of more recent adhesives as described for example in the aforementioned applications WO 2013/017421, WO 2013/017422, WO 2013/017423.

In conclusion, there are many advantages of the multilayer laminate and of the multicomposite strip of the invention (small thickness, low density, low overall cost, resistance to corrosion) compared to conventional metallic fabrics, and the results obtained owing to the invention suggest a very large number of possible applications, especially as an element for reinforcing the belt of vehicle tyres, positioned between the tread and the carcass reinforcement of such tyres.

The invention claimed is:

1. A flat reinforcer having the shape of a multicomposite strip defining three main perpendicular directions, the axial direction X, the transverse direction Y and the radial direction Z, having a width $W_R$ measured along the Y direction of between 2 and 100 mm and having a thickness $T_R$ measured along the Z direction of between 0.1 and 5 mm, the aspect ratio $W_R/T_R$ being greater than 10,
wherein the multicomposite strip comprises at least a plurality of monofilaments made of composite material, orientated along the X direction, comprising filaments of a mineral material embedded in a thermoset resin, the glass transition temperature $T_{g1}$ of which is greater than 70° C.;
wherein the plurality of monofilaments are coated in a layer of thermoplastic material;
wherein all or some of the monofilaments are flat, having a width $W_M$ measured along the Y direction and having a thickness $T_M$ measured along the Z direction, with an aspect ratio $W_M/T_M$ greater than 1.5; and
wherein the average distance d separating one of the flat monofilaments from another of the monofilaments along the Y direction is such that the ratio $d/W_M$ is between 0.1 and 3.0.

2. The flat reinforcer according to claim 1, wherein $T_{g1}$ is greater than 100° C.

3. The flat reinforcer according to claim 2, wherein $T_{g1}$ is greater than 150° C.

4. The flat reinforcer according to claim 3, wherein $T_g$ is greater than 170° C.

5. The flat reinforcer according to claim 4, wherein $T_{g1}$ is equal to or greater than 190° C.

6. The flat reinforcer according to claim 1, wherein a glass transition temperature $T_{g2}$ of the thermoplastic material is greater than −30° C.

7. The flat reinforcer according to claim 6, wherein $T_{g2}$ is greater than 20° C.

8. The flat reinforcer according to claim 7, wherein $T_{g2}$ is greater than 50° C.

9. The flat reinforcer according to claim 8, wherein $T_{g2}$ is greater than 70° C.

10. The flat reinforcer according to claim 1, wherein the elongation at break Ar of the multicomposite strip, measured at 20° C., is equal to or greater than 3.0%.

11. The flat reinforcer according to claim 10, wherein the Ar, measured at 20° C., is equal to or greater than 3.5%.

12. The flat reinforcer according to claim 1, wherein the longitudinal tensile modulus $E_{RL20}$ of the multicomposite strip, measured at 20° C., is greater than 10 GPa.

13. The flat reinforcer according to claim 12, wherein the $E_{RL20}$, measured at 20° C., is between 12 and 20 GPa.

14. The flat reinforcer according to claim 1, wherein the transverse tensile modulus $E_{RT20}$ of the multicomposite strip, measured at 20° C., is greater than 300 MPa.

15. The flat reinforcer according to claim 14, wherein the $E_{RT20}$, measured at 20° C., is between 300 and 3000 MPa.

16. The flat reinforcer according to claim 14, wherein the $E_{RT20}$, measured at 20° C., is greater than 1000 MPa.

17. The flat reinforcer according to claim 16, wherein the $E_{RT20}$, measured at 20° C., is, preferably between 1000 and 3000 MPa.

18. The flat reinforcer according to claim 1, wherein the initial tensile modulus $E_{M20}$ of each monofilament, measured at 20° C., is greater than 30 GPa.

19. The flat reinforcer according to claim 18, wherein the $E_{M20}$, measured at 20° C., is, greater than 35 GPa.

20. The flat reinforcer according to claim 1, wherein the real part of the complex modulus denoted $E'_{M150}$ of each monofilament, measured at 150° C. by the DMTA method, is greater than 25 GPa.

21. The flat reinforcer according to claim 20, wherein the $E'_{M150}$, measured at 150° C. by the DMTA method, is greater than 30 GPa.

22. The flat reinforcer according to claim 1, wherein the compressive elastic deformation in bending of each monofilament is greater than 3.0%.

23. The flat reinforcer according to claim 22, wherein the compressive elastic deformation in bending of each monofilament is greater than 3.5%.

24. The flat reinforcer according to claim 1, wherein the compressive breaking stress in bending of each monofilament is greater than 1000 MPa.

25. The flat reinforcer according to claim 24, wherein the compressive breaking stress in bending of each monofilament is greater than 1200 MPa.

26. The flat reinforcer according to claim 1, wherein the weight content of filaments, in each monofilament, is between 60 and 80%.

27. The flat reinforcer according to claim 26, wherein the weight content of filaments, in each monofilament, is between 65 and 75%.

28. The flat reinforcer according to claim 1, wherein the width $W_M$ of each flat monofilament is between 0.1 and 30 mm.

29. The flat reinforcer according to claim 28, wherein the width $W_M$ of each flat monofilament is between 0.2 and 20 mm.

30. The flat reinforcer according to claim 1, wherein the thickness $T_M$ of each flat monofilament is between 0.05 and 3.0 mm.

31. The flat reinforcer according to claim 30, wherein the thickness $T_M$ of each flat monofilament is between 0.1 and 2.5 mm.

32. The flat reinforcer according to claim 1, wherein the aspect ratio $W_M/T_M$ of each flat monofilament is greater than 2.

33. The flat reinforcer according to claim 32, wherein the aspect ratio $W_M/T_M$ of each flat monofilament is greater than 3.

34. The flat reinforcer according to claim 1, wherein the average distance d separating one of the flat monofilaments from another of the monofilaments along the Y direction is such that the ratio $d/W_M$ is between 0.2 and 2.

35. The flat reinforcer according to claim 1, wherein the number of monofilaments is within a range from 2 to 40.

36. The flat reinforcer according to claim 35, wherein the number of monofilaments is within a range from 3 to 30.

37. The flat reinforcer according to claim 1, wherein all of the monofilaments are flat monofilaments with an aspect ratio $W_M/T_M$ greater than 1.5.

38. The flat reinforcer according to claim 36, wherein all of the monofilaments are flat monofilaments with an aspect ratio $W_M/T_M$ greater than 2.0.

39. The flat reinforcer according to claim 1, wherein the mineral material is selected from the group consisting of glass, carbon, boron and ceramic.

40. The flat reinforcer according to claim 39, wherein the mineral material is glass.

41. The flat reinforcer according to claim 1, wherein the thermoset resin is a polyester or vinyl ester resin.

42. The flat reinforcer according to claim 41, wherein the thermoset rein is a vinyl ester resin.

43. The flat reinforcer according to claim 1, wherein the initial tensile modulus of the thermoset resin, measured at 20° C., is greater than 3.0 GPa.

44. The flat reinforcer according to claim 43, wherein the initial tensile modulus of the thermoset resin, measured at 20° C., is greater than 3.5 GPa.

45. The flat reinforcer according to claim 1, wherein the thermoplastic material is a polymer or a polymer composition.

46. The flat reinforcer according to claim 45, wherein the polymer is selected from the group consisting of polyamides, polyesters, polyimides and mixtures thereof.

47. The flat reinforcer according to claim 46, wherein the polymer is selected from the group consisting of polyesters, polyetherimides and mixtures thereof.

48. The flat reinforcer according to claim 1, wherein the initial tensile modulus of the thermoplastic material, measured at 20° C., is between 300 and 3000 MPa.

49. The flat reinforcer according to claim 48, wherein the initial tensile modulus of the thermoplastic material, measured at 20° C., is between 500 and 2500 MPa.

50. The flat reinforcer according to claim 1, wherein the elastic elongation of the thermoplastic material, measured at 20° C., is greater than 5%.

51. The flat reinforcer according to claim 50, wherein the elastic elongation of the thermoplastic material, measured at 20° C., is greater than 8%.

52. The flat reinforcer according to claim 51, wherein the elongation at break of the thermoplastic material, measured at 20° C., is greater than 10%.

53. The flat reinforcer according to claim 52, wherein the elongation at break of the thermoplastic material, measured at 20° C., is greater than 15%.

54. The flat reinforcer according to claim 1, wherein the minimal thickness $e_{min}$ of the layer of thermoplastic material covering each monofilament at the periphery of the reinforcer is between 0.05 and 0.5 mm.

55. The flat reinforcer according to claim 54, wherein the minimal thickness $e_{min}$ of the layer of thermoplastic material covering each monofilament at the periphery of the reinforcer is between 0.1 and 0.4 mm.

56. The flat reinforcer according to claim 1, wherein the width $W_R$ is between 2.5 and 50 mm.

57. The flat reinforcer according to claim 56, wherein the width $W_R$ is between, preferably between 3 and 40 mm.

58. The flat reinforcer according to claim 1, wherein the thickness $T_R$ is between 0.15 and 3 mm.

59. The flat reinforcer according to claim 58, wherein the thickness $T_R$ is between 0.20 and 2.5 mm.

60. A multilayer laminate comprising at least one flat reinforcer according to claim 1, positioned between and in contact with two layers of a rubber composition.

61. A rubber or plastic article or semi-finished product comprising a flat reinforcer according to claim 1.

62. A rubber or plastic article or semi-finished product comprising a multilayer laminate according to claim 60.

63. A pneumatic or non-pneumatic tire for a vehicle comprising a flat reinforcer according to claim 1.

64. The pneumatic or non-pneumatic tire according to claim 63, wherein the flat reinforcer is present in the belt or the carcass reinforcement of the pneumatic or non-pneumatic tire.

65. The pneumatic or non-pneumatic tire according to claim 63, wherein the flat reinforcer is present in the bead zone of the pneumatic or non-pneumatic tire.

66. A pneumatic or non-pneumatic tire for a vehicle comprising a multilayer laminate according to claim 60.

67. The pneumatic or non-pneumatic tire according to claim 66, wherein the multilayer laminate is present in the belt or the carcass reinforcement of the pneumatic or non-pneumatic tire.

68. The pneumatic or non-pneumatic tire according to claim 66, wherein the multilayer laminate is present in the bead zone of the pneumatic or non-pneumatic tire.

* * * * *